United States Patent [19]
Webb et al.

[11] 3,772,531
[45] Nov. 13, 1973

[54] METHOD AND CONTROL CIRCUIT FOR LIQUID LEVEL CONTROL SYSTEMS

[75] Inventors: Robert M. Webb, Cornell; Keith S. Parry, Granada Hills, both of Calif.

[73] Assignee: T. H. Creears Corporation, Los Angeles, Calif.

[22] Filed: Nov. 22, 1971

[21] Appl. No.: 201,074

[52] U.S. Cl. ............ 307/252 N, 73/304 R, 137/392, 137/393, 307/252 H, 307/308, 307/118, 340/244
[51] Int. Cl. ......................................... H03k 17/72
[58] Field of Search ..................... 307/252 H, 252 J, 307/252 N, 308, 118; 73/304 R; 137/392, 393; 340/244, 247

[56] References Cited
UNITED STATES PATENTS

| | | | |
|---|---|---|---|
| 3,580,158 | 5/1971 | Scholle et al. | 137/392 X |
| 3,206,615 | 9/1965 | La Pointe | 307/252 N |
| 3,279,379 | 10/1966 | Klyce | 307/252 N |
| 3,312,936 | 4/1967 | Huntzinger | 73/304 R |
| 3,477,460 | 11/1969 | Dotto | 73/304 R |

Primary Examiner—John Zazworsky
Attorney—Carl R. Brown et al.

[57] ABSTRACT

A control circuit having a gate with a liquid level detecting probe in the gate circuit of the gate. The probe controlled gate circuit has a resistor in series with a unidirectional device, which unidirectional device prevents the flow of stray line capacitance induced current from the probe connecting lines to the gate circuit. However the detection of liquid levels by the probe pulls sufficient current through the probe circuit, diode and resistor to close the gate.

11 Claims, 4 Drawing Figures

PATENTED NOV 13 1973 3,772,531

INVENTOR.
ROBERT M. WEBB
BY Brown & Martin
ATTORNEYS

METHOD AND CONTROL CIRCUIT FOR LIQUID LEVEL CONTROL SYSTEMS

BACKGROUND OF THE INVENTION

There are many known systems for detecting liquid levels and either setting off alarms or initiating the operation of motor pump units and like devices for pumping the liquid down to a desired level. Such systems normally employ probes that project at various levels into the volume in which the liquid is located for detecting liquid levels and coordinating the operation of the alarms or motor pump units. The probes employed normally react through direct contact with the liquid. So in such systems, the probes project directly into the liquid or are inserted in, for example, an enclosed housing having means for moving a secondary liquid in the housing in direct relationship with the level of the outside liquid to contact enclosed multi-level probes. The latter probe system facilitates the detection of fluid levels in fluids that are corrosive, or that have sufficient impurities therein to cause a build-up on the probe that could eventually restrict electrical contact between the liquid and the probe to provide a signal indicating that the liquid level has reached the probe.

The systems that use direct electrical contact between the probe and the liquid and rely upon direct electrical current flow from the probe to the adjacent ground, require that the current flow be sufficient in magnitude to assure effective probe liquid level detection through many different types of liquids, and through films that may adhere to the outer surface of the probes over a period of time. Yet in sewer systems, such probe systems have the possibility of creating a spark discharge that could ignite an explosion of sewer gas. So to protect the probes and also to reduce the possibility of hazardous explosions, the aforesaid system of enclosing the probes within a flexible container and having a secondary liquid system within the container has found some use. But these enclosed container systems are expensive, do not always reflect the actual conditions of the fluid level within the container and have other limitations that makes their overall use undesirable.

Thus it is advantageous to have a probe circuit for a liquid control system that is capable of use with a bore probe projecting into the liquid system, such as a sewer system, which probe circuit detects given liquid levels and yet draws only a very small current flow, and that has protection against false operation of the probe gating circuit because of line capacitance and which probe gating circuit has positive protection against undesired reverse biasing of the gate.

SUMMARY OF THE INVENTION

In an embodiment of this invention, an electronic probe circuit controls the operation of a pump control unit, that in turn controls the operation of a motor driven pump to hold the liquid in a liquid system to given prescribed levels. These liquid systems may comprise, for example, liquids in tanks or in sewer systems. In the pump control circuit, an SCR device gates the power to the pump control unit for operating the pump motor. The SCR circuit has a gate or bias control circuit that is actuated by the probe to gate the SCR and thus close the pump control circuit.

The desired criteria for the probe circuit is that the probe does not draw a significant amount of current in sensing the level of the liquid and in turning-on the gate circuit of the SCR. So the exposed probe must not present a shock hazard. Yet there must be enough gate current to absolutely assure that the SCR device will fire when the probe senses the liquid level, and there must be a reverse bias system such that the SCR device does not trigger itself, thus providing an erroneous operation.

In an embodiment of this invention, the gate circuit of the SCR device has a resistance and a unidirectional device in series with the probe. The probe thus functions as a detector, that through direct contact with or capacitive connection with the liquid, draws current through the resistor and diode to bias the SCR device. This in effect connects the probe and circuit to the neutral of the input power circuit and turns on the SCR device.

In normal installation, the probe is connected to the rest of the probe circuit through a substantial length of wire. So there is inevitably some stray capacitance from the probe lead to ground. This displacement current which flows through the stray capacitance, if the stray capacitance is sufficiently large, can create a displacement current that is large enough to trigger the SCR device and thus false operate the pump control unit. However, the unidirectional device only allows a current to flow into the gate and never out. Thus any such stray capacitance cannot cause biasing current to flow out of the SCR biasing circuit and the SCR device cannot be inadvertently fired. Still further the alternating current flowing through the SCR device allows the stray capacitance to reach peak value. At this value it will block reverse current through the unidirectional device and prevent current from flowing in either direction. With no gate current, the SCR device remains shut off. Upon the probe sensing liquid level, then the stray capacitance is immediately discharged and current flows from the biasing circuit causing the SCR device to be gated and allowing normal operation of the pump control unit.

In other embodiment, the stray-capacitance-created-blocking of reverse current flow in the gate circuit, is reinforced by directly connecting the cathode side of the SCR device to the gate circuit through a unidirectional device. In still another modification of the invention, the cathode of the SCR device is connected to the gate circuit, with other circuitry preventing the occurrence of excessive current in the probe circuit.

Thus the possible effect of stray capacitance in causing false gating of the SCR device is not only prevented, but this stray capacitance is used to prevent current flow into the gating circuit, unless and until there is a triggering of the probe in detecting liquid levels. So false operation of the probe circuit and thus the pump control circuit is averted while a simple, efficient and inexpensive probe circuit is provided.

It is therefore an object of this invention to provide a new and improved method and probe circuit for liquid level control systems.

It is another object of this invention to provide a new and improved method and probe circuit for liquid level control systems that uses electronic circuitry to detect liquid levels through a probe that does not present a shock hazard to the liquid environment.

It is another object of this invention to provide a new and improved probe circuit and method of operating same for liquid level control systems in which an SCR device, used as the gating element, has a gate circuit controlled to assure correct firing of the SCR device and to avert erroneous firing, and which gate circuit not only avoids the problem of stray capacitance causing inadvertent firing of the SCR device, but employes the stray capacitance to prevent current flow in the gate circuit to only those times that the system is triggered by the probe.

Other objects and many advantages of this invention will become more apparent upon a reading of the following detailed description and an examination of the drawing, wherein like reference numerals designate like parts throughout and in which.

Figure 1:
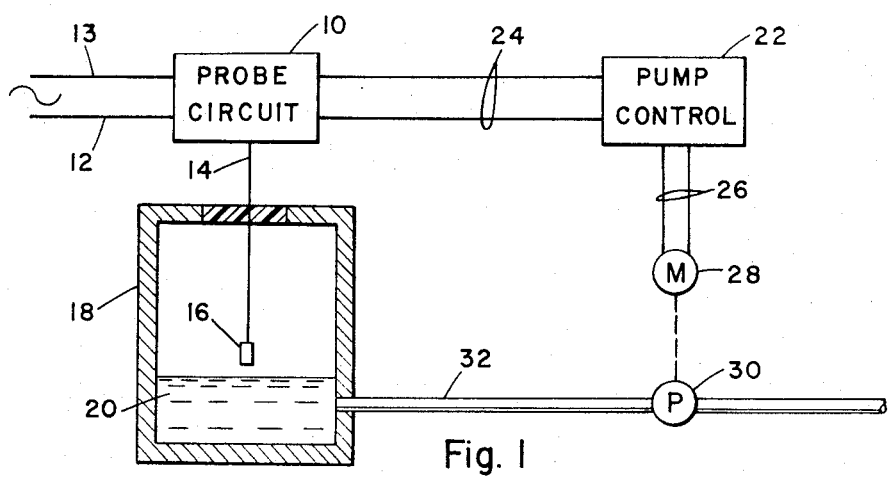
FIG. 1 is a block diagram of an exemplary fluid level control system.

Referring now to FIG. 1, a probe circuit 10, controls the input power, which is normally alternating current, through lines 12 and 13 to lines 24 to the pump control unit 22. The pump control unit 22, when energized through probe circuit 10, supplies power through lines 26 to motor 28 that operates pump 30 to pump fluid through pipe 32 from the fluid 20 in the fluid reservoir 18. This operation is commenced when the fluid 20 either directly contacts probe 16 or sufficiently approaches probe 16 to pull current from probe 16 to the ground or to the neutral of the input alternating current power circuit. It should be recognized that probe 16 can be any suitable electrical conductor, and the reservoir 18 can be any suitable liquid container such as a sewer system or the like.

Figure 2:
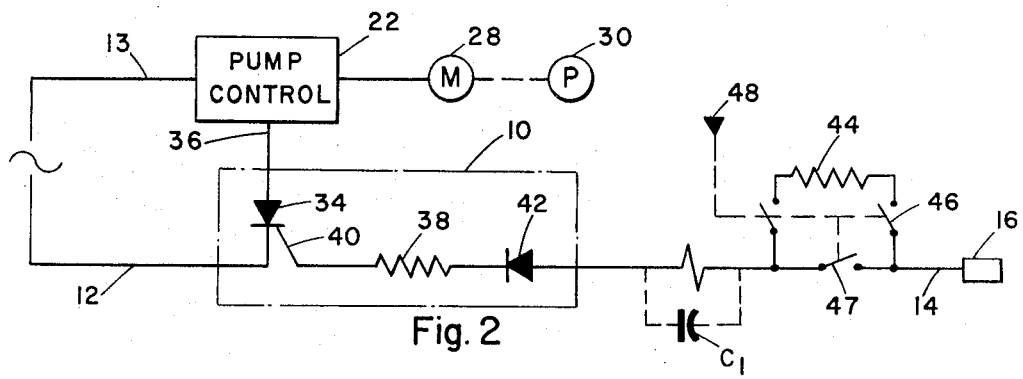
FIG. 2 is a block diagram and schematic diagram of an embodiment of the probe circuit of this invention.

Referring to FIG. 2, alternating current is connected by lines 12 and 13 across SCR device 34, line 36 and pump control 22. SCR 34 is only energized during the negative half cycle when line 12 is negative with respect to line 13 (ground). When SCR device 34 is energized, electrical power is applied to the pump control 22. The gate circuit 40 for biasing the SCR device 34 to the energized condition, comprises a resistance 38, unidirectional device 42, and probe 16 that is connected thereto by probe line 14. In desired installations, the probe line 14 has a substantial length.

In operation of the probe circuit, when probe 16 is connected with the liquid 20, then probe 16 is electrically connected to ground or in effect to the neutral side of the power source or to line 13, the gate-cathode junction of SCR 34 is effectively in series with resistor 38 and unidirectional device 42 so that a unidirectional current path exists from line 12 through the cathode-gate of SCR 34 and through resistance 38 and unidirectional device 42. The probe being grounded, the circuit is held to zero voltage. When line 12 is negative, the gate circuit is positive to the input voltage and gate current flows to SCR 34 turning it on. So trigger current is supplied to the SCR device through line 14, unidirectional device 42, resistor 38 and gate circuit line 40. The SCR device is turned on and power is applied to the load or pump control 22 through lines 12, 36 and 13. Resistor 38 functions to limit the gate current to a safe value. When the probe 16 connection to the liquid is open, no current is delivered to the gate circuit 40 and the SCR device shuts off and power is removed from the load.

Since the probe is connected to the rest of the probe circuit through the long length of wire 14, there is inevitably some stray capacitance from the probe lead 14 to ground or to the neutral side of the power circuit. Thus displacement current could flow through this stray capacitance and into the gate circuit 40. If this stray capacitance is sufficiently large, then the displacement current could be large enough to trigger the SCR device 34 and supply unwanted power to the load. However this false triggering due to stray capacitance is prevented by diode 42 in the gate lead.

With diode 42 in the gate lead, current can only flow into the gate circuit 40 and never out. So when line 12 is ngative, negative current flows through the current path from line 12, through the cathode-gate of SCR 34, through resistance 38 and unidirectional device 42. This charges the line 14 side of stray capacitance $C_1$, shown in dotted lines in representative form in FIG. 2, to about negative line voltage. When line 13 is negative relative to line 12, then unidirectional device 42 blocks any such current flow into the gate circuit 40.

The stray capacitance, $C_1$, since current through it is unidirectional, must accumulate a charge. The speed of charging depends upon the time constant of stray capacitance $C_1$ and resistance 38. Eventually the stray capacitance $C_1$ charges to a potential almost equal to the peak line voltage. The polarity of the charge in capacitance $C_1$ is such as to buck the supply voltage when line 13 is positive to line 12. If and when the charge on stray capacitance $C_1$ reaches its peak potential, and if the unidirectional device 42 is capable of blocking the reverse current, then no current can flow in either direction in the gate circuit 40, gate lead and probe lead 14. So there is no gate current and the SCR device remains shut off. This prevents erroneous operation of the SCR device 34.

When probe 16 completes the sensor circuit, the charge in the stray capacitance $C_1$ is immediately shorted out. When the probe circuit again opens up, the stray capacitance $C_1$ once again charges up. The SCR device will remain turned on during this charging time. However by proper choice of resistance 38, this charging time is very short so that the charging period represents simply a negligible delay in removing power from the load. The circuit is then again ready for operation.

In some known electronic probe circuits, it is necessary that the probe circuit be connected in the immediate area of the probe 16, to avoid the problem of stray capacitance. However with this circuit, long connecting lines may be used and the probe circuit may be connected at more convenient locations. However, if very long probe lines are employed with very large stray capacitances, then resistance 44 may be connected in series with the probe circuit through closing switch 46 by switch actuating means 48 and opening switch 47. This places a suitable resistance at the probe to limit the discharge current. It has been found unlikely that the discharge current will ever be sufficient to create any type of shock hazard.

In actual operation of the circuit, there can be a very small leakage of current from gate circuit 40. This leakage is normally prevented by using a line circuit in gate circuit 40 that has a high leakage current resistance.

Further a low leakage, unidirectional device 42 is also used. However should there be sufficient leakage, then it will be recharged by momentary firing of the SCR device 34. This will be so momentary as to not cause any indication of false operation.

Figure 3:
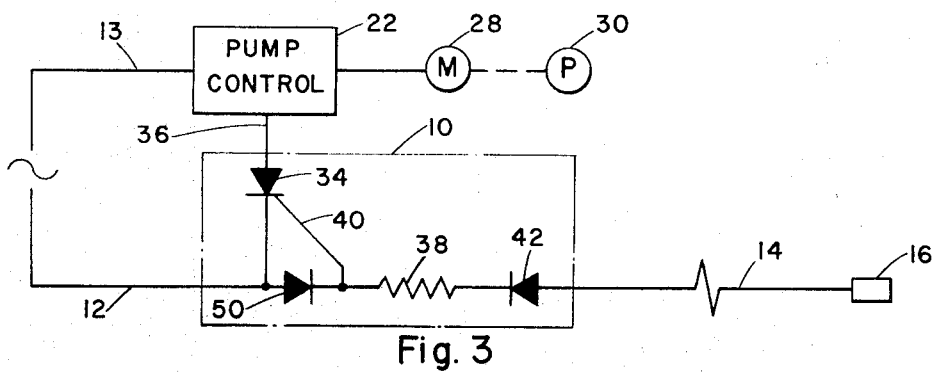
FIG. 3 is a block diagram and schematic diagram of a modified embodiment of the probe circuit of this invention.

Referring to FIG. 3, while the SCR device 34 is very reliable and is widely used, the triggering current for given SCR devices is often temperature sensitive and there can be wide variations in the required trigger current even among SCR devices made by the same manufacturer. So, it is possible for an SCR device, particularly if it has a sensitive gate, to turn itself on even in the absence of externally applied gate current. Thus reverse gage current can originate within the SCR device itself. To provide an SCR gate that will not false operate even when the SCR device attempts to turn itself on, a diode 50 is connected across the gate and cathode. Diode 50 provides a shunt impedance, normally about a 1 volt drop, across the gate-cathode junction of SCR 34 during the positive half-cycle, that is when line 12 is positive and the SCR 34 is reverse biased. With the alternating current input, the SCR device cannot fire because the gate is reverse biased directly from the input source by the diode. So in the positive cycle, positive voltage is in the gate circuit to diode 42. The SCR device will not fire under these conditions and the reverse biased, negative current is not applied to the probe circuit 16 because it is stopped by the unidirectional device 42. When positive current is applied to line 12, then the SCR device is in a condition to be turned on by the gate circuit 40 and unidirectional device 50 prevents this current from being conducted through to the probe circuit 16.

Figure 4:
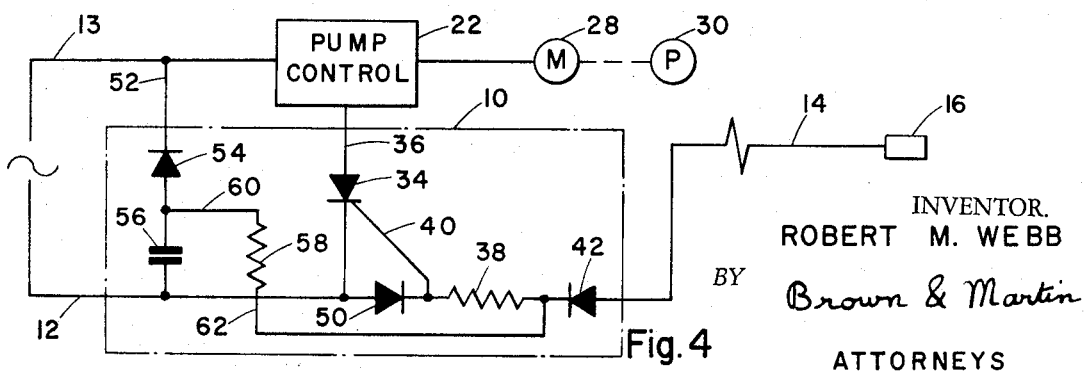
FIG. 4 is a block diagram and schematic diagram of still another modified embodiment of the probe circuit of this invention.

Referring to FIG. 4, the probe circuit 10 employs the probe circuit of FIG. 3 with additional means for preventing increased probe current. In this embodiment, diode 54 rectifies the AC line voltage and capacitor 56 smooths the rectified DC voltage. A DC voltage nearly equal to the peak of the AC supply will appear across capacitor 56. When the probe circuit is open, discharged bias current flows through unidirectional device 50, resistor 38, and resistor 58. So as long as probe 16 is open, there is always a 1 volt reverse bias on the gate of SCR 34. Resistance 58 is much larger than resistance 38 or the impedance of unidirectional device 50, so that resistance 58 and the rectified voltage establish the magnitude of the current, Id. The resulting voltage drop Db across diode 50 is in such a direction as to apply a reverse bias between the gate circuit and cathode of the SCR device 34. As long as the reverse bias is maintained, the gate will not trigger.

When probe 16 closes and line 12 goes through the negative half-cycle, diode 42 becomes forward biased at a level that is determined by the ratio of resistance 58 and resistance 38. When diode 42 becomes forward biased, it clamps the discharge current from capacitor 56 and supplies gate drive current to SCR 34 through resistor 38. The capacitor being continually charged, looks like a battery that continually discharges through diode 50. This maintains an effective one volt drop across the SCR 34 to prevent leakage back through SCR 34 that would turn on SCR 34. The sum of the diode current plus the reverse gate current is equal to Ib. If the reverse gate current should exceed Ib, then the diode current shuts off entirely and the gate voltage goes positive. The gate might now trigger. However this is avoided by making the bias current exceed the largest possible reverse gate current. So when the probe circuit completes the sensor circuit, the bias current is shunted away from the gate and both gate and bias current flow in the probe.

Having described by invention, I now claim.

1. In a control system for controlling a liquid level through detection of the liquid level by the closing to ground of a probe circuit having a probe which probe circuit is capable of forming with the adjacent environment a capacitive storage of an electrical charge,
   a gate circuit having gate circuit means for gating an alternating current control signal in response to a gate signal received from the probe circuit,
   said gate circuit including circuit means for electrically connecting the probe of the probe circuit to said gate circuit means in series connection with a current limiting device,
   and a rectifier in series connection with said current limiting device for passing a charging unidirectional current through said gate circuit means and said circuit means to said probe circuit for capacitive storage in said probe circuit, which stored electrical charge is discharged when the probe circuit closes turning on the gate circuit means for gating the control signal.

2. In a control system as claimed in claim 1 in which,
   said current limiting device being adjacent said gate circuit means,
   and said rectifier being positioned between said current limiting device and the probe circuit.

3. In a control system as claimed in claim 1 in which,
   the probe circuit being connected to said gate means solely by said series connection with said current limiting device and said rectifier,
   and the current limiting device is adjacent said gate means.

4. In a control system as claimed in claim 1 in which, said gate circuit means comprises an SCR device.

5. In a control system as claimed in claim 4 in which,
   said current limiting device being adjacent said SCR device,
   and said rectifier being positioned between said current limiting device and the probe circuit to prevent the flow of a given polarity of gate current to the SCR device through said circuit means.

6. In a control system as claimed in claim 5 in which,
   said SCR device having an anode, a cathode and a gate lead,
   said circuit means being connected to said gate lead,
   a second rectifier electrically connected between said cathode and said gate lead and being positioned to pass reverse bias voltage to said circuit means.

7. In a control system as claimed in claim 5 including,
   second circuit means comprising a capacitor connected in a junction to a resistance in series between said SCR cathode and said SCR anode with said capacitor being adjacent said SCR cathode,
   a second resistance in series between said SCR cathode and said SCR anode with said capacitor being adjacent said SCR catode,
   a second resistanc being connected between said junction and said circuit means at a point between said rectifier and said current limiting device,
   and said capacitor being charged by said control signal to provide a current discharge through said second resistance and said current limiting device and said second rectifier, where by a voltage drop is provided across said second rectifier that is also across the cathode and gate lead of said SCR device.

8. In a control system as claimed in claim 5 in which, said probe circuit being capable of having long lead lines that incur stray capacitance that is charged by the alternating current through said SCR device, and said rectifier being capable of preventing stray capacitance induced current from passing to said SCR device.

9. In a control system as claimed in claim 8 including, means for inserting a current limiting resistance in the probe circuit adjacent the probe.

10. The method of providing probe circuit control of alternating current signals to a control system for controlling a liquid level through detection of the liquid level by a probe, comprising the steps of, gating a control voltage to the control system by an SCR device, providing a probe circuit induced gating signal through a biasing circuit to bias the SCR device to the on condition, limiting the current flow in the biasing circuit, passing a charging unidirectional current through the biasing circuit for capacitive storage in said probe circuit which stored charge prevents turning on the SCR device, and then discharging the stored charge when the probe circuit closes providing a current path through the probe circuit for the gating signal to turn on the SCR device gating the control voltage.

11. In the method claimed in claim 10 including the step of, allowing only reverse bias current to flow through an electrical connection of the cathode and bias circuit of the SCR device.

* * * * *